United States Patent
Stapperfenne et al.

(10) Patent No.: US 9,902,096 B2
(45) Date of Patent: Feb. 27, 2018

(54) PRODUCTION OF FIBRE COMPOSITE COMPONENT PART BASED ON ALUMINIUM AND POLYURETHANE

(71) Applicant: Evonik Degussa GmbH, Essen (DE)

(72) Inventors: Uwe Stapperfenne, Wülfrath (DE); Sandra Reemers, Münster (DE); Markus Hallack, Schermbeck (DE)

(73) Assignee: EVONIK DEGUSSA GmbH, Essen (DE)

( * ) Notice: Subject to any disclaimer, the term of this patent is extended or adjusted under 35 U.S.C. 154(b) by 276 days.

(21) Appl. No.: 14/705,563

(22) Filed: May 6, 2015

(65) Prior Publication Data
US 2015/0321393 A1    Nov. 12, 2015

(30) Foreign Application Priority Data

May 6, 2014    (DE) .................. 10 2014 208 423

(51) Int. Cl.
*B29C 43/02*    (2006.01)
*B32B 15/08*    (2006.01)
(Continued)

(52) U.S. Cl.
CPC .......... *B29C 43/021* (2013.01); *B32B 15/08* (2013.01); *B32B 15/14* (2013.01); *B32B 15/20* (2013.01);
(Continued)

(58) Field of Classification Search
None
See application file for complete search history.

(56) References Cited

U.S. PATENT DOCUMENTS 3,520,750 A * 7/1970 Prevorsek ............. B29C 43/305
                                                        156/199
4,671,985 A * 6/1987 Rodrigues ............... B29C 53/04
                                                        428/215
(Continued)

FOREIGN PATENT DOCUMENTS

CA    2 878 089           1/2014
DE    19914420 A1    10/2000
(Continued)

OTHER PUBLICATIONS

U.S. Appl. No. 13/824,084, filed May 20, 2013, US2013/0231022 A1, Schmidt, et al.
(Continued)

*Primary Examiner* — Joseph A Miller, Jr.
(74) *Attorney, Agent, or Firm* — Grüneberg and Myers PLLC

(57) ABSTRACT

A method of producing a fiber composite component part has the following steps: a) providing two or more metal sheets each comprising an aluminum material; b) providing at least one textile fabric; c) providing an anhydrous mixture having one or more than one hardener having a uretdione having an NCO functionality of not less than two, one or more than one binder having hydroxyl groups to an OH functionality of three to six, and one or more than one cobinder having oxirane groups; d) coating the textile fabric with the anhydrous mixture, to obtain a mixture-coated fabric; e) applying energy to the mixture-coated fabric for the purpose of performing a first crosslinking reaction to react hardener, binder and cobinder to form a thermoplastic polymer adhering to the textile fabric; f) hot pressing the metal sheets and the textile fabric together with the thermoplastic polymer adhering thereto into a sandwich such that the thermoplastic polymer joins the metal sheets together while enclosing the textile fabric; g) forming the sandwich
(Continued)

into a shaped article; and h) heat treating the shaped article to obtain the fiber composite component part, wherein the thermoplastic polymer undergoes a second crosslinking reaction to convert into a thermoset polymer.

19 Claims, 1 Drawing Sheet

(51) Int. Cl.
*B32B 15/14* (2006.01)
*B32B 15/20* (2006.01)
*B32B 19/02* (2006.01)
*B32B 27/04* (2006.01)
*B32B 27/40* (2006.01)
*C09J 5/06* (2006.01)
*C08G 18/58* (2006.01)
*C08G 18/79* (2006.01)
*C08G 18/40* (2006.01)
*C08G 18/42* (2006.01)
*C09J 175/06* (2006.01)
*B29K 63/00* (2006.01)
*B29L 9/00* (2006.01)
*B32B 37/20* (2006.01)
*B32B 38/08* (2006.01)
*B32B 38/12* (2006.01)
*B32B 38/00* (2006.01)

(52) U.S. Cl.
CPC .............. *B32B 19/02* (2013.01); *B32B 27/04* (2013.01); *B32B 27/40* (2013.01); *C08G 18/4045* (2013.01); *C08G 18/4277* (2013.01); *C08G 18/58* (2013.01); *C08G 18/798* (2013.01); *C09J 5/06* (2013.01); *C09J 175/06* (2013.01); *B29K 2063/00* (2013.01); *B29L 2009/003* (2013.01); *B32B 37/20* (2013.01); *B32B 38/08* (2013.01); *B32B 38/12* (2013.01); *B32B 2038/0076* (2013.01); *B32B 2305/076* (2013.01); *B32B 2311/00* (2013.01); *B32B 2375/00* (2013.01); *C09J 2400/163* (2013.01); *C09J 2475/00* (2013.01)

(56) References Cited

U.S. PATENT DOCUMENTS

| 4,912,210 | A | 3/1990 | Disteldorf et al. |
|---|---|---|---|
| 6,210,521 | B1* | 4/2001 | Chuang ............... B29B 9/12 156/269 |
| 6,790,537 | B1 | 9/2004 | Bartz et al. |
| 8,455,090 | B2 | 6/2013 | Schmidt et al. |
| 2003/0104241 | A1 | 6/2003 | Rasshofer |
| 2012/0003890 | A1* | 1/2012 | Schmidt ............ C08G 18/0895 442/1 |
| 2012/0276364 | A1 | 11/2012 | Kennedy et al. |
| 2013/0230716 | A1 | 9/2013 | Schmidt et al. |
| 2013/0231017 | A1 | 9/2013 | Schmidt et al. |
| 2013/0231022 | A1 | 9/2013 | Schmidt et al. |
| 2013/0323993 | A1 | 12/2013 | Schmidt et al. |
| 2014/0087613 | A1 | 3/2014 | Spyrou et al. |
| 2015/0174642 | A1 | 6/2015 | Krammer et al. |

FOREIGN PATENT DOCUMENTS

| DE | 10158491 A1 | 6/2003 |
|---|---|---|
| DE | 102009001806 A1 | 9/2010 |
| DE | 102011006163 A1 | 9/2012 |
| DE | 10 2012 106 206 A1 | 1/2014 |
| EP | 0 317 744 A2 | 5/1989 |
| EP | 0 317 744 A3 | 5/1989 |
| WO | WO1998/021029 A1 | 5/1998 |
| WO | WO2009/009207 A2 | 1/2009 |
| WO | WO 2011/083289 A1 | 7/2011 |
| WO | WO 2012/093006 A1 | 7/2012 |
| WO | WO 2014/139796 A1 | 9/2014 |

OTHER PUBLICATIONS

U.S. Appl. No. 13/824,035, filed May 22, 2013, US2013/0230716 A1, Schmidt, et al.
U.S. Appl. No. 13/824,064, filed May 9, 2013, US2013/0231017 A1, Schmidt, et al.
U.S. Appl. No. 13/978,059, filed Aug. 21, 2013, US2013/0323993 A1, Schmitt, et al.
U.S. Appl. No. 14/705,485, filed May 6, 2015, Stapperfenne, et al.
U.S. Appl. No. 14/774,395, filed Sep. 10, 2015, Spyrou, et al.
European Search Report dated Oct. 23, 2015 in Patent Application 15164477.0 with English translation of categories of cited documents.
Hans Josef Laas, et al., "Zur Synthese aliphatischer Polyisocyanate—Lackpolyisocyanate mit Biuret-, Isocyanura-order Uretdionstruktur" Journal für praktische Chemie, vol. 336, No. 3, XP000441642, 1994, pp. 185-200.

\* cited by examiner

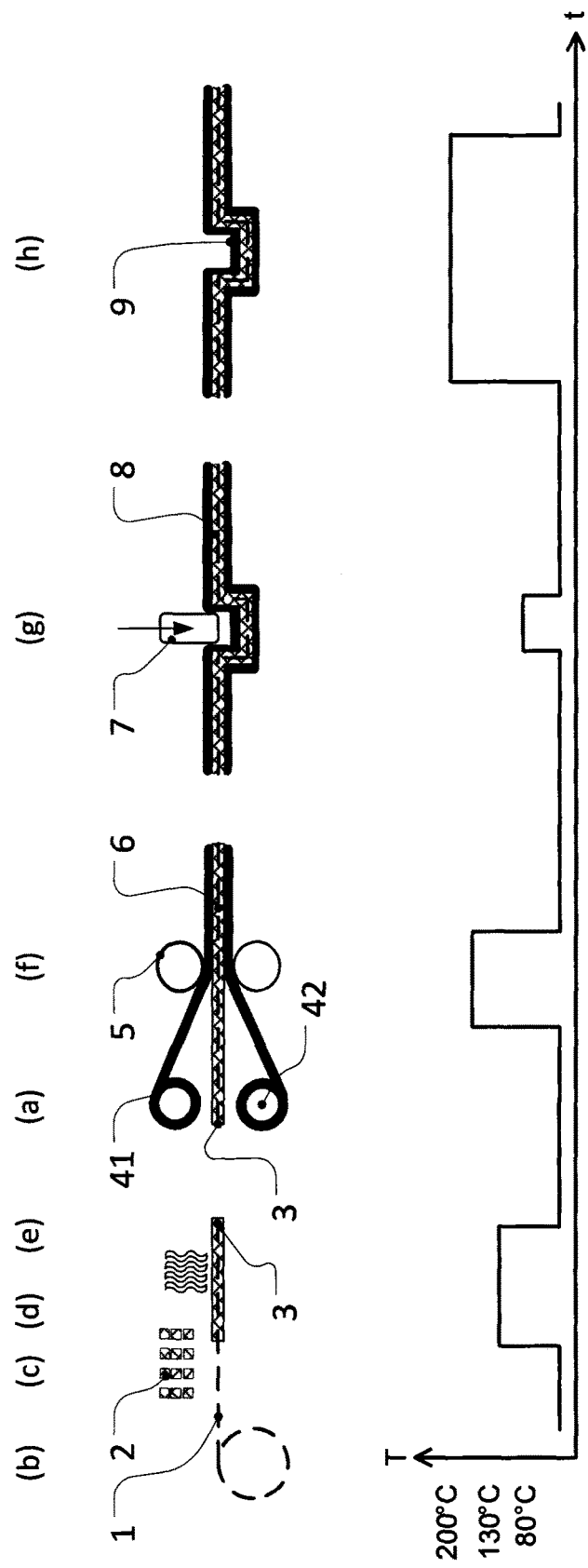

PRODUCTION OF FIBRE COMPOSITE COMPONENT PART BASED ON ALUMINIUM AND POLYURETHANE

BACKGROUND OF THE INVENTION

Field of the Invention

The invention relates to the production of a fibre composite component part based on aluminium and polyurethane.

Discussion of the Background

Fibre composite component part refers to a component part which is a component part of a machine, of a land-, air-, space- or water-craft, of an apparatus, of an installation or of an appliance and which is constructed of different, indissolubly interconnected materials subject to the proviso that at least one material takes the form of fibres and at least one material takes the form of a matrix surrounding said fibres. The shape of this fibre composite component part is substantially the shape that is determined by its intended use. As a result, the fibre composite component part is virtually ready to install/use and, apart from minor secondary finishing, requires no further significant changes in shape before installation/use.

The present fibre composite component part comprises an aluminium material, polyurethane as well as the fibre material.

Aluminium material is to be understood as referring to a group of alloys whose mass content of aluminium is greater than that of every other element present. The aluminium aside, aluminium materials generally contain at least one of the following alloying metals: magnesium, manganese, silicon, zinc, lead, copper or titanium. Iron, by contrast, is only present as an undesired impurity. The aluminium material may take the form of a wrought alloy or of a cast alloy.

Polyurethane is to be understood as referring to a group of polymers that are obtained by reaction of diisocyanates with polyols. Polyurethane is frequently abbreviated to PU or PUR.

Compared with component parts produced from homogeneous materials, the production of fibre composite component parts has one special feature: this is that, while a homogeneous material is generally already in existence before the component part is produced, a fibre composite material is only formed in the course of the actual fibre composite component part being produced. Therefore, the production of a fibre composite component part is always directly tied to the production of the related fibre composite material.

Similarly, the design and construction of the fibre composite material must always take account of the later loading on the fibre composite component part consisting of said fibre composite material in order that the loads are as intended directed via the matrix into the fibres and transmitted by them.

The materials science of manufacturing fibre composite component parts is accordingly much more tricky than the materials science of producing component parts from homogeneous materials.

This is particularly true when a fibre composite component part is to be constructed from rather dissimilar materials, for example when carbon fibre, which is inorganic, is to be embedded in an organic-type polymer matrix and the latter is to be additionally surrounded with metallic outer layers.

A fibre composite component part of this type promises to combine the advantages of the particular individual materials to obtain overall a component part of very high mechanical strength, good thermal insulation, vibration damping and corrosion resistance coupled with very low weight.

Producing such a component part is a supreme technical challenge, since the specific expertise of organic and inorganic chemistry, of metal processing and regarding the in-service conditions expected for the component part must be combined.

It is particularly noteworthy that the industrial manufacture of polymers differs greatly from metal production and processing, especially with regard to workflow organization. The industrial practice of the method developed for producing a fibre composite component part based on aluminium and polyurethane can accordingly only be successful if said method can be integrated in both the workflow of a chemical manufacturing operation and the workflow of a metal-processing operation.

It will be appreciated that numerous examples of organometallic fibre composite component parts are already found in the related art:

DE10158491A1 for instance discloses a metal-polyurethane laminate constructed of two layers of electrogalvanized sheets of steel which are arranged either side of a polyurethane layer which may incorporate filler and reinforcing agents. The polyurethane is cured between the steel sheets to form a plate-shaped composite component part possessing high mechanical strength. This method of production is disadvantageous in that it always leads to a planar laminate, the utility of which is limited by its flatness. True, a peel test is described in the form of a bending test wherein the laminate is bent by 90° and back again. However, an elevated application of force is needed for this forming operation, since at this stage the polyurethane is already thermoset and so the composite component part has already attained its full strength. As to whether the formed laminate is shape-stable and does not strive to return to its original flat shape, DE10158491A1 is silent. This method is incidentally also disadvantageous because of the rapid reaction of the isocyanate/polyol components to form the polyurethane, making it necessary to produce this composite component part under time pressure. Nor is a fibre composite component part concerned here, but a sandwich of polymer and sheet metal. Aluminium-magnesium alloys are recited as an alternative metal material to the sheet steel.

A similarly constructed steel-PU composite component part is known from DE19914420A1. However, the thickness of the steel is an immense 2 to 20 mm, so the steel here is in the form of heavy plate which, unlike fine sheet (thickness <3 mm), is not coilable. A laminate of this type is therefore impossible to process with a conventional panel press of the type used in automotive construction for example. This is why ship or bridge building is instead the intended destination for the laminate. There is no mention here of aluminium materials.

The composite structure known from WO98/21029A1 is similarly intended for ship building. It comprises two outer, mutually spaced-apart plates of steel either side of a void space packed with an elastomeric polyurethane. The elastomer dampens vibrations in the metal structure. Again, this is not a fibre composite component part. Moreover, the elastomer is not introduced into the void space until after finalizing the steel structure. Again, aluminium materials are not mentioned.

WO2009/009207A2 discloses a method of producing a fibre composite component part based on a metal and a thermoplastic polyurethane. To this end, an already fibre-containing thermoplastic polyurethane raw material is melted and press formed between metal sheets under heat. Aluminium materials are recited as metal. This method is advantageous in that the fibre composite component part may also assume a non-flat shape and requires few processing steps. This method is disadvantageous in that the fibres, in the form of short fibre, are already present in the polyurethane raw material, thus preventing intentional alignment of the fibres in the direction of the later transmission/distribution of forces/stresses. What is made, on the contrary, is a fibre composite component part comprising randomly aligned fibre.

The sandwich panel known from DE102012106206A1 covers a distinctly wider spectrum of possible uses. It comprises two metallic outer sheets either side of a core layer of fibre-containing polyurethane. This sandwich panel has good plastic formability; even deep-drawability into three-dimensional carbody parts. One disadvantage here is the aqueous formulation of the reactive polyurethane mixture, so water vapour has to escape from the laminate during the processing operation. Unless all the water is successfully removed, internal corrosion of the steel sheets is likely. In addition, the reported polyurethane composition is highly reactive, so shaping has to take place within a tight processing window. Overall it appears to be questionable whether the method described in DE102012106206A1 is capable of producing a steel-PU composite component part on an industrial scale and in a commercially viable manner.

The problem of the tight processing window for high-reactive polyurethane mixtures was solved in DE102009001806A1 by incipiently crosslinked yet storage-stable prepregs, which are thermoplastically formable and are fully crosslinked thermoset thereafter. The particular advantage of these prepregs—that is, woven or non-crimp fabric coated with matrix material—resides in their stability in storage. As a result, they are sufficiently long storable and transportable in the incipiently crosslinked, thermoplastic state. So, while the prepregs are manufactured in a first facility, their forming into a shaped article and the full crosslinking thereof into the fibre composite component part may be carried out elsewhere, at a remote site. This allows new degrees of freedom in the organization of fibre composite component part production and particularly also competency-based division of labour across two or more production facilities. However, these storage-stable prepregs are disadvantageous in that they are not unreservedly useful for lamination with aluminium materials. More particularly, they fail to achieve a sufficient level of aluminium polymer bonding for safely forming a laminate obtained therefrom, as Example 0 will demonstrate herein below.

Consequently, no method has been described to date for obtaining fibre composite component parts from an aluminium material and a polyurethane on an industrial scale and in a commercially viable manner.

It is an object of the present invention to devise such a method.

SUMMARY OF THE INVENTION

This and other objects are achieved by
1. A method of producing a fibre composite component part, comprising:
a) providing two or more metal sheets each comprising an aluminium material;
b) providing at least one textile fabric;
c) providing an anhydrous mixture containing
   one or more than one hardener comprising a uretdione having an NCO functionality of not less than two,
   one or more than one binder having hydroxyl groups to an OH functionality of three to six,
   and one or more than one cobinder having oxirane groups;
d) coating the textile fabric with the mixture;
e) applying energy to the mixture-coated fabric for the purpose of performing a first crosslinking reaction to react hardener, binder and cobinder to form a thermoplastic polymer adhering to the textile fabric;
f) hot pressing the metal sheets and the textile fabric together with the thermoplastic polymer adhering thereto into a sandwich such that the thermoplastic polymer joins the metal sheets together while enclosing the textile fabric;
g) forming the sandwich into a shaped article;
h) heat treating the shaped article to obtain the fibre composite component part, wherein the thermoplastic polymer undergoes a second crosslinking reaction to convert into a thermoset polymer.

It is such a method of producing a fibre composite component part which is subject matter of this invention.

In other embodiments, an object of the present invention is achieved by

2. A method according to 1, wherein the mixture is used as a dry pulverulent mixture and sprinkled onto the textile fabric.

3. A method according to 1, wherein the mixture is used in the form of a solution in one or more than one organic solvent, in particular an organic solvent selected from the group comprising esters and ketones, wherein the textile fabric is impregnated with the solution and wherein the solvent is subsequently removed again from the textile fabric by evaporation.

4. A method according to 3, wherein the evaporation of the solvent and the application of energy to the mixture for the purpose of performing the first crosslinking reaction is carried out in one operation by heating at a temperature of 80° C. to 160° C., preferably at a temperature of 120° C. to 160° C., particularly preferably at a temperature of 140° C. to 160° C., where heating time is in particular in the range from 10 minutes to 30 minutes.

5. A method according to 1 or according to any of 2 to 4, wherein the heating involved in the course of hot-pressing the metal sheets and the textile fabric together with the thermoplastic polymer adherent thereto into the sandwich is at a temperature of 80° C. to 180° C., preferably at a temperature of 100° C. to 170° C., particularly preferably at a temperature of 120° C. to 160° C., wherein the duration for the heating is in the range from 3 minutes to 20 minutes.

6. A method according to 1 or according to any of 2 to 5, wherein the step of forming the sandwich into the shaped article is carried out at a temperature of 20° C. to 160° C., preferably at a temperature of 20° C. to 100° C.

7. A method according to 1 or according to any of 2 to 6, wherein the heat treatment of the shaped article for the purpose of performing the second crosslinking reaction takes place at a temperature of 170° C. to 210° C., preferably of 180° to 200° C., more particularly, wherein it takes place at a temperature which is not less than 20° C. higher than the temperature at which the first crosslinking reaction is carried out, wherein the thermal treatment is carried out for a period of, in particular, 20 minutes to 60 minutes.

8. A method according to 1 or according to any of 2 to 7, wherein metal sheets comprising a heat-treatable alloy of aluminium are utilized.

9. A method according to 1 or according to any of 2 to 8, wherein the sheets of an aluminium material used have a corrosion-resistant coat, in particular wherein anodized sheets are used or sheets endowed with a chemical finish based on a polyurethane.

10. A method according to 1 or according to any of 2 to 9, wherein the hardener used comprises uretdiones free from blocking agent which are prepared from one or more of the following substances:

isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI) mixture, norbornane diisocyanate (NBDI), wherein uretdiones free from blocking agent which are prepared from IPDI, HDI, TMDI and/or H12MDI are used with particular preference.

11. A method according to 1 or according to any of 2 to 10, wherein one or more than one polyol compound is used as binder.

12. A method according to 1 or according to any of 2 to 11, wherein the binder used is one or more than one polyester with OH number is between 25 and 400, whose acid number is not more than 2 mg KOH/g and whose molar mass is between 1000 and 4000 g/mol, in particular wherein two or more polyesters conforming to this specification are used as binder.

13. A method according to 1 or according to any of 2 to 12, wherein the binder used is with particular preference one or more than one polycaprolactone whose OH number is between 540 and 25, whose acid number is between 0.5 and 1 mg KOH/g and whose molar mass is between 240 and 1000 g/mol, in particular wherein two or more polycaprolactones as per this specification are used alone or—with particular preference—in combination with the polyesters as per the specification recited in 12, as binder.

14. A method according to 1 or according to any of 2 to 13, wherein the cobinder used is one or more than one compound comprising oxirane groups and having an epoxy equivalent weight (EEW) of between 182 and 940 g/eq., in particular wherein two or more such compounds are used as cobinder.

15. A method according to 1 or according to any of 2 to 14, wherein the cobinder used comprises epoxy resins selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl-3,4-epoxycyclohexanecarboxylate, particular preference being given to bisphenol A-based epoxy resins and to bisphenol F-based epoxy resins.

16. A method according to 1 or according to any of 2 to 15, wherein the mixture is free from substances that have a catalytic effect on the first and/or second crosslinking reaction.

17. A method according to 1 or according to any of 2 to 16, wherein the textile fabric comprises a woven fabric, a non-crimp fabric, a knitted fabric or a nonwoven fabric of carbon fibre, glass fibre or aramid fibre.

18. A method according to 1 or according to any of 2 to 17, wherein its steps a) to f), i.e. up to and including the stage of the sandwich being obtained, are carried out as a continuous roll-to-roll process.

19. A method according to 1 or according to any of 2 to 18, wherein the sandwich obtained as per step 1) is immediately or only after a pause of 1 to 6 months formed into a shaped article as per step g), in particular wherein the sandwich is transported to a remote forming facility during this pause.

20. A step of a method according to 1 or according to any of 2 to 19, practised for the purpose of practising the entire method.

The invention has for its object to devise a method whereby fibre composite component parts are produced from aluminium and polyurethane in industrial practice and in a commercially viable manner. It is a fundamental concept of the method according to the present invention to use a polyurethane composition which is special in that it conforms to the manufacturing process, in that it is capable of undergoing a first crosslinking reaction to convert it into a thermoplastic polymer and later a second crosslinking reaction to fully crosslink the thermoplastic polymer into a thermoset material. According to the present invention, the full crosslinking into the thermoset polymer is only carried out after a shape-conferring forming step, and so the final high strength of the component part is only attained after the component part has already assumed its ultimate in-service shape. The invention is notable for closely harmonizing the choice of chemicals with the mechanical processing steps to thereby exploit synergies in the processing of plastics and of aluminium.

BRIEF DESCRIPTION OF DRAWINGS

FIG. 1 shows at top a schematic processing sequence plus a related temperature profile, not true to scale, therebelow.

LIST OF REFERENCE NUMERALS (a)-(h) method steps of a method according to the present invention,
1 textile fabric,
2 mixture,
3 prepreg,
41 first sheet of aluminium material,
42 second sheet of aluminium material,
5 calendar or double lamination press,
6 sandwich,
7 deep-drawing press,
8 shaped article,
9 fibre composite component part.

DETAILED DESCRIPTION OF THE INVENTION

It is a fundamental concept of the method according to the present invention to use a polyurethane composition which is special in that it conforms to the manufacturing process, in that it is capable of undergoing a first crosslinking reaction to convert it into a thermoplastic polymer and later a second crosslinking reaction to fully crosslink the thermoplastic polymer into a thermoset matrix material. This thermoplastic polymer has the advantage that it is comparatively easy to form under heat while safely ensuring adherence to the aluminium sheets. It is accordingly possible to form the flat laminate into a three-dimensional shape without the sheet metal detaching from the polymer. According to the present invention, the full crosslinking into the thermoset polymer is only carried out after the shape-conferring forming step, and so the final high strength of the component part is only attained after the component part has already assumed its ultimate in-service shape. This greatly reduces the forming forces and the risk of delamination during forming.

The invention is thus notable for closely harmonizing the choice of chemicals with the mechanical processing steps to thereby exploit synergies in the processing of plastics and of aluminium.

One key to the success of the present invention is the choice of the right polyurethane composition to permit two-step crosslinking while at the same time achieving high adherence to the aluminium material. A suitable mixture is set out in claim 1 and further particularized in the dependent claims.

The recited mixture also has the special advantage that it leads to a storage-stable thermoplastic polyurethane, the further reaction of which is not rapid. It is accordingly possible to store or transport the partially crosslinked sandwich before it is formed in the next step. It is thereby possible to divide the production method between different facilities and so even make it possible to operate the method beyond company boundaries. This is a huge organizational advantage.

The recited mixture also has the processing advantage that it is anhydrous and so does not generate disruptive water during the manufacturing operation. The absence of water is also beneficial to the later fibre composite component part, since it is impossible for it to contain any water residues which would cause the metal sheets to rust from the inside and which may disrupt the adherence of the component part.

Instead of water, the invention provides that the reactive mixture be used either in dry pulverulent form or in liquid form, viz. dissolved in one or more than one organic solvent.

When the mixture is used as a dry pulverulent mixture, the step of coating the textile fabric with the mixture simply takes the form of sprinkling the mixture onto the fabric. Melting and incipient crosslinking are effected via energy input, for example in the form of heat radiation or IR radiation. The pulverulent route is accordingly particularly friendly to the environment in that there are no solvents which have to be removed.

When the mixture is used in liquid form, as a solution in one or more than one organic solvent, the step of coating the textile fabric takes the form of impregnating same with the solution. This has the advantage over sprinkling the mixture onto the fabric that the reactive mixture will in this way also penetrate deeply into the textile fabric, thereby improving the adherence of the mixture to the textile during manufacture and later the adherence of the fibre-matrix bond in the composite. A liquid mixture is accordingly preferred to the pulverulent version.

Solvents used are preferably esters or ketones such as, for example, methyl isobutyl ketone or isopropyl acetate, since these are good solvents for the relevant hardeners, binders and cobinders. Two or more solvents may also be mixed.

The number of solvents used should not be greater than necessary to effect complete dissolution of the components and achieve good impregnation of the textile. Practical experience has shown that about 35-50% by weight of solvent, based on total mixture weight, is sufficient.

The recited solvents are readily removable again from the textile fabric after impregnation by evaporation. All that is needed for this are low temperatures compared with the water because of the high volatility of these solvents. In addition, these solvents provide negligible residual-solvent contents after drying. Water cannot achieve this at comparable temperatures because of its high enthalpy of vaporization and therefore may give rise not only to corrosion phenomena but potentially also to partial de-adherence after the thermal cure, through evaporation of residual water between the metal sheets.

The low evaporation temperature of these solvents affords the technical advantage that the evaporation of the solvent, the attainment of low residual-solvent contents and the application of energy to the mixture for the purpose of performing the first crosslinking reaction can all be carried out in one operation by heating at a temperature of 80° C. to 160° C. That saves time and energy.

This combined operation is preferably carried out at a temperature of 120° C. to 160° C., while the temperature range from 140° C. to 160° C. is particularly preferable. Heating time is preferably in the range from 10 minutes to 30 minutes.

By contrast, the heating involved in the course of hot-pressing the metal sheets and the textile fabric together with the thermoplastic polymer adherent thereto into the sandwich is at a temperature of 80° C. to 180° C., while the temperature range from 100° C. to 170° C. is preferable and that from 120° C. to 160° C. is particularly preferable. The duration for this heating is in the range from 3 minutes to 20 minutes.

The step of forming the sandwich into the shaped article is carried out at a temperature of 20° C. to 160° C., preferably at a temperature of 20° C. to 100° C.

As long as the polyurethane is still in the thermoplastic state, the above-discussed processing temperatures are still comparatively moderate. Full crosslinking into the thermoset, then, requires higher temperatures.

To wit, the heat treatment of the shaped article for the purpose of performing the second crosslinking reaction takes place at a temperature of 170° C. to 210° C., preferably of 180° to 200° C. More particularly, the second crosslinking should take place at a temperature which is not less than 20° C. higher than the temperature at which the first crosslinking reaction is carried out. The temperature gap serves to prevent the polyurethane already becoming fully crosslinked in the first thermal treatment. The second thermal treatment is carried out for a period of, in particular, 20 minutes to 60 minutes.

A particularly preferred embodiment of the invention utilizes sheets comprising a heat-treatable alloy of aluminium. The underlying idea is for the step of fully crosslinking the polyurethane to the thermoset to simultaneously effect a heat treatment of the aluminium material in order to enhance its sustained strength and energy absorption.

Heat-treatable aluminium materials are described in DIN 1747 Part 1. Preference is given to using sheets comprising one of the following heat-treatable wrought aluminium alloys:
AlMgSi1, AlCuMgPb, AlCuMg1, AlCuMg2, AlZn4.5Mg1, AlZnMgCu1.5.

The aluminium sheets used may have a natural or technical corrosion-resistant coat. Possibilities include in particular an anodization or a prior application of a suitable chemical finish, for example a chemical finish based on polyurethane.

As mentioned, it is the polyurethane chemistry used which is determinatively responsible for the success of the invention. The exact composition of the mixture which, via two-step crosslinking, gives rise first to a thermoplastic polymer from the class of the polyurethanes and later to a thermoset polymer from the class of the polyurethanes, will now be more particularly described.

The mixture is made up of three basic components, viz. a hardener, a binder and a cobinder. The individual components may in turn be mixtures of two or more substances, so the mixture may also comprise two or more hardeners, binders or cobinders. The mixture may additionally contain further components, for example processing aids, added-substance materials such as deaerators, defoamers, flow assistants, wetting agents and levelling assistants. Further known additives and addition agents but also pigments or flame retardants may be used as necessary.

The hardeners used are uretdiones having an NCO functionality of not less than two. Functionality in the context of uretdiones is to be understood as meaning the number of free isocyanate groups which is capable of chemical reaction following ring opening. A functionality of 2 is needed to create a very close-meshed network following the reaction with the employed polyols having a functionality above 3, otherwise an insufficiently crosslinked matrix is obtained, lacking the mechanical strengths required herein.

Uretdiones are obtained by polymerization of isocyanates. Polyisocyanates comprising uretdione groups are well known, being described in U.S. Pat. No. 4,476,054, U.S. Pat. No. 4,912,210, U.S. Pat. No. 4,929,724 and EP 417 603 for example. A comprehensive overview of industrially relevant methods for dimerization of isocyanates to uretdiones is found in J. Prakt. Chem. 336 (1994), 185-200. The conversion of isocyanates into uretdiones is generally carried out in the presence of soluble dimerization catalysts such as, for example, dialkylaminopyridines, trialkyl phosphines, phosphoramides or imidazoles. The reaction, optionally carried out in solvents, but preferably in the absence of solvents, is stopped—by addition of catalyst poisons—once a desired degree of conversion is attained. Excess isocyanate monomer is subsequently separated off by short-path evaporation. When the catalyst is sufficiently volatile, the catalyst may be removed from the reaction mixture in the course of monomer removal. The addition of catalyst poisons may be eschewed in this case. In principle, a wide range of isocyanates are useful for preparing polyisocyanates comprising uretdione groups.

The di- and polyisocyanates used according to the present invention for preparing the uretdiones may consist of any desired aliphatic, cycloaliphatic and/or (cyclo)aliphatic di- and/or polyisocyanates.

Useful aliphatic di- or polyisocyanates have advantageously from 3 to 16 carbon atoms, preferably from 4 to 12 carbon atoms, in the linear or branched alkylene moiety, while useful cycloaliphatic or (cyclo)aliphatic diisocyanates advantageously have from 4 to 18 carbon atoms, preferably from 6 to 15 carbon atoms, in the cycloalkylene moiety. (Cyclo)aliphatic diisocyanate is well understood in the art as referring to both cyclically and aliphatically attached NCO groups, as is the case with isophorone diisocyanate for example. By contrast, cycloaliphatic diisocyanates are diisocyanates where both the NCO groups are directly attached to the cycloaliphatic ring, e.g. $H_{12}MDI$. Examples are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate, dodecane di- and triisocyanates.

Likewise suitable are 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane.

Preference is given to di- and polyisocyanates from any desired aliphatic, cycloaliphatic and/or (cyclo)aliphatic di- and/or polyisocyanates. The invention uses isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethylhexamethylene diisocyanate (TMDI), norbornane diisocyanate (NBDI). Very particular preference is given to using IPDI, HDI, TMDI and/or $H_{12}MDI$. Very particular preference is given to using the uretdione of IPDI and/or HDI. Mixtures of any desired uretdiones may also be used as hardener.

Internally blocked (uretdiones) di- and polyisocyanates are preferably used as hardener. The uretdiones used are free from external blocking agents because they are internally blocked via a dimerization via uretdione structures which, at elevated temperature, retrocleave back into the isocyanate structures originally present and thereby start off the crosslinking with the binder. Hardeners free from blocking agents are a paramount requirement for the intended use envisaged herein because they react without detaching volatile external blocking agents. Hardeners containing blocking agents detach the volatile blocking agent during the thermal crosslinking. The result is a volume increase by the blocking agent between the metal sheets of the sandwich and the consequential delamination between prepreg and metal.

Useful hydroxyl-containing binders include in principle any of the polyols typically used in PU chemistry provided their OH functionality is between three and six. Functionality in the context of polyol compounds refers to the number of reactive OH groups they have in the molecule. The intended use requires the use of polyol compounds having an OH functionality of 3 to 6 because the reaction with the isocyanate groups of the uretdiones is to construct a three-dimensional dense network of polymer.

Examples of useful polyols include:

|  | OH number (approx.) | Molar mass | Producer |
|---|---|---|---|
| Glycerol | 1800 | 92 | Perstorp |
| Polyol 3165 | 1010 | 165 | Perstorp |
| Polyol 3380 | 380 | 440 | Perstorp |
| Polyol 3610 | 610 | 280 | Perstorp |
| Polyol 3940 | 940 | 180 | Perstorp |
| Polyol 3990 | 990 | 170 | Perstorp |
| Polyol 4290 | 290 | 800 | Perstorp |
| Polyol 4360 | 360 | 630 | Perstorp |
| Polyol 4525 | 525 | 430 | Perstorp |
| Polyol 4640 | 640 | 360 | Perstorp |
| Polyol 4800 | 800 | 280 | Perstorp |
| Polyol R3215 | 215 | 1010 | Perstorp |
| Polyol R3430 | 430 | 400 | Perstorp |
| Polyol R3530 | 530 | 310 | Perstorp |
| Polyol R3540 | 540 | 310 | Perstorp |
| Polyol R3610 | 610 | 280 | Perstorp |
| Polyol R4631 | 630 | 280 | Perstorp |
| Polyol R6405 | 405 | 830 | Perstorp |
| Voranol CP 260 | 660 | 255 | Dow |
| Voranol CP 300 | 565 | 300 | Dow |
| Voranol CP 450 | 380 | 450 | Dow |
| Voranol CP 755 | 240 | 700 | Dow |
| Voranol CP 1055 | 155 | 1000 | Dow |
| Voranol RH 360 | 360 | 700 | Dow |
| Voranol RN 490 | 490 | 490 | Dow |
| Voranol RA 640 | 640 | 350 | Dow |
| Voranol RA 800 | 800 | 280 | Dow |
| Terathane 650 | 170 | 650 | DuPont |
| Terathane 1000 | 100 | 1000 | Du Pont |

-continued

|  | OH number (approx.) | Molar mass | Producer |
|---|---|---|---|
| Capa 3031 | 560 | 300 | Perstorp |
| Capa 3041 | 395 | 425 | Perstorp |
| Capa 3050 | 310 | 540 | Perstorp |
| Capa 3091 | 180 | 900 | Perstorp |
| Capa 4101 | 220 | 1000 | Perstorp |

It will be appreciated that mixtures of these polyols may also be used.

Useful binders further include polyols that contain further functional groups. The familiar linear or branched hydroxyl-containing polyesters, polycarbonates, polycaprolactones, polyethers, polythioethers, polyesteramides, polyurethanes or polyacetals are concerned here. Their number-average molecular weight is preferably in the range from 134 to 3500. Preference is given to linear hydroxyl-containing polyesters—polyester polyols—or mixtures thereof. They are prepared, for example, by reaction of diols with substoichiometric amounts of dicarboxylic acids, corresponding dicarboxylic anhydrides, corresponding dicarboxylic esters of lower alcohols, lactones or hydroxycarboxylic acids.

Diols useful for preparing polyester polyols are: ethylene glycol, 1,2-propanediol, 1,3-propanediol, diethylene glycol, dipropylene glycol, triethylene glycol, tetraethylene glycol, 1,2-butanediol, 1,4-butanediol, 1,3-butylethylpropanediol, 1,3-methylpropandiol, 1,5-pentanediol, bis(1, 4-hydroxymethyl) cyclohexane (cyclohexanedimethanol), glycerol, hexanediol, neopentylglycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethyl-1,3-hexanediol, 1,4-butylene glycol, 2,3-butylene glycol, di-β-hydroxyethylbutanediol, 1,5-pentanediol, 1,6-hexanediol, 1,8-octanediol, decanediol, dodecanediol, neopentylglycol, cyclohexanediol, 3(4),8(9)-bis(hydroxymethyl)tricyclo[5.2.1.02,6]decane (dicidol), 2,2-bis(4-hydroxycyclohexyl)propane, 2,2-bis[4-(β-hydroxyethoxy) phenyl]propane, 2-methyl-1,3-propanediol, 2-methylpentane-1,5-diol, 2,2,4(2,4,4)-trimethyl-1,6-hexanediol, 1,2,6-hexanetriol, 1,2,4-butanetriol, tris(β-hydroxyethyl) isocyanurate, mannitol, sorbitol, polypropylene glycols, polybutylene glycols, xylylene glycol or neopentylglycol hydroxypivalate, 2-methylpropanediol, 2,2-dimethylpropanediol, diethylene glycol, 1,12-dodecanediol, 1,4-cyclohexanedimethanol, 1,2-cyclohexanediol and 1,4-cyclohexanediol.

The dicarboxylic acids or derivatives useful for preparing polyester polyols may be aliphatic, cycloaliphatic, aromatic and/or heteroaromatic in nature and may optionally be substituted, for example by halogen atoms, and/or be unsaturated.

The preferred dicarboxylic acids or derivatives include succinic acid, adipic acid, suberic acid, azelaic acid, sebacic acid, 2,2,4(2,4,4)-trimethyladipic acid, phthalic acid, phthalic anhydride, isophthalic acid, terephthalic acid, dimethyl terephthalate, tetrahydrophthalic acid, maleic acid, maleicanhydride and dimeric fatty acids.

Useful polyester polyols further include polyester polyols obtainable in a known manner, via ring opening, from lactones, such as, ε-caprolactone, and simple diols as starter molecules.

Any desired mixtures may be used of the diols and dicarboxylic acids/derivatives used for preparing polyester polyols.

Particular preference for use as binders is given to polyesters whose OH number is between 25 and 400, whose acid number is not more than 2 mg KOH/g and whose molar mass is between 1000 and 4000 g/mol. OH number is determined similarly to DIN 53 240-2, acid number is determined similarly to DIN EN ISO 2114. Molar mass is computed from hydroxyl and carboxyl end groups. It is especially two or more such polyesters which are used as binder.

Polyesters excel as binders having particularly good adherence to metal (Organic Coatings: Science and Technology, Z. W. Wicks, Jr. F. Jones, S. P. Pappas, Wiley-Interscience, New York 1999, chap. 24.2.1.2, page 459). Polyesters having the characteristic values mentioned further make possible the achievement of the level of flexibility needed for the intended use and the processing steps. These properties of said polyesters are also taken advantage of in coil coating and can coating, cf. Ullmann's Encyclopedia of Industrial Chemistry, Vol. A 18, p. 526-528, VCH Verlag, 1991.

Very particular preference for use as binders is given to polycaprolactones whose OH number is between 540 and 25, whose acid number is between 0.5 and 1 mg KOH/g and whose molar mass is between 240 and 10 000 g/mol. Useful polycaprolactones include Capa 3022, Capa 3031, Capa 3041, Capa 3050, Capa 3091, Capa 3201, Capa 3301Capa 4101, Capa 4801 Capa 6100, Capa 6200, Capa 6250, all from Perstorp in Sweden. It will be appreciated that mixtures of polycaprolactones, polyesters and polyols may also be used.

The cobinder used is a compound containing an oxirane group.

Any epoxy resins are useful in principle as cobinder. Epoxy resins include, for example, polyepoxides based on bisphenol A diglycidyl ether, bisphenol F diglycidyl ether or cycloaliphatic types.

Epoxy resins used as cobinder are preferably selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl-3,4-epoxycyclohexanecarboxylate, particular preference being given to bisphenol A-based epoxy resins and to bisphenol F-based epoxy resins.

Mixtures of epoxy resins are also useful as cobinder in the present invention.

The epoxy equivalent weight (EEW) of the cobinder should be between 182 and 940 g/eq. (determined as per ASTM D 1652). Taking account of the epoxy equivalent weights mentioned provides not only for an improvement in the metal adherence of the matrix but also for additional crosslinking without the forming properties being adversely affected. The use of epoxy compounds having an EEW above 940 g/eq will lead not only to a matrix viscosity too high to process but also to excessive embrittlement of the matrix, meaning that mechanical stresses are no longer safely survivable.

Conventional reactive polyurethane compositions include catalysts to hasten the crosslinking reaction. But this is precisely not what is wanted in this invention, since the sandwich is to be stable in storage and ideally crosslinkable without external application of heat. This is why the mixture is preferably free from substances that have a catalytic effect on the first and/or second crosslinking reactions. "Free from" is to be understood in this context as meaning that no catalyst is intentionally admixed to the mixture. The presence of a catalytically active substance as a trace constituent will not be harmful to the inventive concept.

Catalytically active substances include particularly quaternary ammonium salts, preferably tetraalkylammonium salts and/or quaternary phosphonium salts with halogens, hydroxides, alkoxides or organic or inorganic acid-derived anions as counter-ion. Examples thereof are:
tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate and tetrabutylphosphonium acetate, tetrabutylphosphonium formate and ethyltriphenylphosphonium acetate, tetrabutylphosphonium benzotriazolate, tetraphenylphosphonium phenoxide and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methoxide, methyltriethylammonium methoxide, tetramethylammonium methoxide, tetraethylammonium methoxide, tetrapropylammonium methoxide, tetrabutylammonium methoxide, tetrapentylammonium methoxide, tetrahexylammonium methoxide, tetraoctylammonium methoxide, tetradecylammonium methoxide, tetradecyltrihexylammonium methoxide, tetraoctadecylammonium methoxide, benzyltrimethylammonium methoxide, benzyltriethylammonium methoxide, trimethylphenylammonium methoxide, triethylmethylammonium methoxide, trimethylvinylammonium methoxide, methyltributylammonium ethoxide, methyltriethylammonium ethoxide, tetramethylammonium ethoxide, tetraethylammonium ethoxide, tetrapropylammonium ethoxide, tetrabutylammonium ethoxide, tetrapentylammonium ethoxide, tetrahexylammonium ethoxide, tetraoctylammonium methoxide, tetradecylammonium ethoxide, tetradecyltrihexylammonium ethoxide, tetraoctadecylammonium ethoxide, benzyltrimethylammonium ethoxide, benzyltriethylammonium ethoxide, trimethylphenylammonium ethoxide, triethylmethylammonium ethoxide, trimethylvinylammonium ethoxide, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride.

The mixture may further contain auxiliary materials or additives customary in polyurethane chemistry, for example deaerators, defoamers, release agents, fillers, flow assistants, organic or inorganic dyes and pigments, wetting agents and levelling assistants.

The mixture comprises the above-discussed components in the following weight percentages:
Hardener: 25% to 45% by weight
Binder: 10% to 40% by weight
Cobinder: 1% to 15% by weight
Additives: 0.05% to 5% by weight
Solvent: 35% to 50% by weight
The resulting sum total is 100 parts by weight.

The textile fabric comprises a woven fabric, a non-crimp fabric, a knitted fabric or a nonwoven fabric in carbon fibre, glass fibre or aramid fibre, as typical for use in fibre composite materials. Carbon fibre woven twill fabrics are particularly preferable.

In one particularly preferred refinement of the invention, steps a) to f) of the method of production, i.e. up to and including the stage of the sandwich being obtained, are carried out as a continuous roll-to-roll process. Roll-to-roll is to be understood as meaning that the solid starting materials are in the form of roll product (aluminium foil and textile as web material off the roll) and that the intermediate product, viz. the sandwich, is likewise wound up as roll product. The moving textile web is impregnated and pressed together with the metal sheets using heated rotating cylinders (calenders) or using a double lamination press. A roll-to-roll process is particularly efficient.

Owing to its stability in storage and its deformability, the sandwich can be wound back up as a roll and transported as a roll for further processing as per steps g) and h) like a conventional aluminium coil. Prior to the forming step, the sandwich roll is unwound and cut into sheets, so that it may be formed, by deep drawing for example, like a conventional panel. The logistics then correspond to those of conventional panel processing, thereby significantly facilitating the introduction of the novel technology. A panel processor where the sandwich is the starting point for performing steps g) and h) is simply supplied—not with an aluminium coil as hitherto—but with a partially crosslinked sandwich roll which, like previously the aluminium sheet, is formed into a fibre composite component part by the panel processor. One reason why this works is that the second crosslinking step automatically entails a heat treatment of the aluminium for the purpose of strengthening.

Owing to the divisibility of the operations up to and including sandwich production and thereafter for further processing into the final composite component part, a preferred development of the invention provides that the sandwich obtained as per step f) is immediately or only after a pause of 1 to 6 months formed into a shaped article as per step g). This time is used in particular for transporting the sandwich to a remote forming facility, where it is then formed. The thermoplastic matrix material remains stable in storage for such a long period.

Since the method of the present invention is ideally practised across various production facilities and these may perfectly well be affiliated to different companies, protection is also sought for any one single method step in so far as its practice serves to actualize the entire method in the manner of the present invention.

The in-principle processing sequence as per the method will now be elucidated with reference to a schematic depiction, where FIG. 1 shows: at top a schematic processing sequence plus a related temperature profile, not true to scale, therebelow.

A textile fabric 1 is unwound off a roll in the form of a web and provided in that form for the process (step b). The textile fabric may be, for example, a woven fabric of carbon fibres.

There is further provided a mixture 2 comprising the reactive components for forming a polyurethane (step c). They are essentially a hardener, a binder and a cobinder. These constituents are dissolved in an organic solvent, so mixture 2 is in the form of a liquid.

The liquid mixture 2 is applied to the web by drenching, dipping or other methods suitable for continuous processing, to thereby impregnate the textile fabric with mixture 2 such that ideally all the fibres are surrounded by the reactive components (step d).

It is then necessary to induce a first crosslinking reaction whereby hardener, binder and cobinder are reacted into a thermoplastic polyurethane adhering to the textile fabric. For this it is initially necessary to establish intimate contact between the components. The solvent has to be removed for this. This is accomplished by moderate heating at about 130° C. (see temperature profile). The heat evaporates the solvent, causing it to leave the textile fabric 1. The reactive components of mixture 2 which remain behind on the fibres react to form a thermoplastic polymer (step e) which adheres to the textile fabric 1 and thus forms a prepreg 3.

The first crosslinking reaction was induced by input of energy via the heat which is also used to evaporate the solvent. Steps d and e thus take place during the first application of heat and transition directly into each other. The first application of heat, at 130° C., is for about 20 minutes.

Two metal sheets 41, 42 are then provided in an aluminium material, each off a coil (step a). The metal sheets preferably consist of a heat-treatable aluminium alloy.

The two metal sheets 41, 42 and the prepreg 3 are then led into a calender and/or a double lamination press 5. The two sheets 41 and 42 are either side of prepreg 3. Calender 5 comprises two heated cylinders for hot pressing. The use of a heatable double lamination press is similarly possible.

The calender or double lamination press 5 compresses the two sheets 41, 42 and the textile fabric together with the adherent thermoplastic polymer (prepreg 3) under pressure for about 2-10 minutes at 130° C. to 160° C. heat into a sandwich 6 (step f). The layer sequence of sandwich 6 is aluminium sheet 41, prepreg 3, aluminium sheet 42.

The heat introduced via the calender cylinders or double lamination press maintains the thermoplastic in a flowable state to ensure good adherence of the polymer to the aluminium material. As the sandwich 6 emerges from the calender or double lamination press 5, the thermoplastic polyurethane joins the two metal sheets 41 and 42 together by enclosure of the textile fabric, so the sandwich 6 is conveniently handelable in one piece without delaminating. At this stage it already amounts to a fibre composite material having a thermoplastic matrix.

However, the sandwich 6 still has a flat shape. To endow it with a three-dimensional shape, it is then sent into a forming step wherein a deep-drawing press 7 converts the sandwich 6 into a three-dimensionally shaped article 8 by the action of forming or to be more precise deep drawing (step g).

The deep-drawing press 7 may likewise be heated in order to promote some flowing of the thermoplastic during the forming operation. This reduces the pressing forces and the risk of the sandwich delaminating during deep drawing. The temperature of the deep-drawing press 7 is about 80° C., the deep-drawing operation only takes about a minute.

It may be noted at this juncture that the step of forming the sandwich 6 (step g) need not take place directly after the compressing step (step f). On the contrary, the sandwich 6 may first be rolled up like a coil and then transported (not depicted in FIG. 1) to the deep-drawing press 7. Owing to the fact that the polyurethane used is stable in storage in that without an energy input it cannot be further crosslinked out of its incipiently crosslinked, thermoplastic state, the sandwich 6 is readily storable and transportable as a coil, for example in a pressing facility where deep-drawing press 7 is installed. There the sandwich coil is then unrolled and cut into sheets. The sandwich is then fed into the sheet operation in the form of a sheet. The roll-to-roll process accordingly ends with the wind-up of the sandwich following step f.

The shaped part 8 emerging from the deep-drawing press 7 already essentially has the geometry of the final fibre composite component part 9. It is virtually custom-pressable. Nonetheless, shaped part 8 is still not ready to use, since its matrix is still in the thermoplastic state.

Establishing the ultimate mechanical properties requires a second crosslinking reaction to further crosslink the thermoplastic into a thermoset polyurethane.

The second crosslinking reaction is again induced by heating. But this is now to a higher temperature level than previously, viz. at 200° C., and for a longer period of about 30 minutes. The reason why the heat treatment of shaped article 8 requires a higher temperature and a longer duration is that the full crosslinking of the polyurethane has higher energy requirements than the incipient crosslinking has. The end of the heat treatment of shaped article 8 (step h) is marked by the final fibre composite component part 9, wherein the polymer has attained its fully crosslinked, thermoset state and thereby endows the fibre composite component part 9 with its full strength. Since shaped article 8 already had the desired shape and this desired shape passes through the heat treatment substantially unchanged, no further change in shape is required for the fibre composite component part 9 apart from minor secondary finishing.

The heat treatment for performing the second crosslinking reaction (step h) may incidentally also be utilized for enhancing the strength of the aluminium material of shaped article 8: the heat treatment of the aluminium alloy for strengthening and the full crosslinking of the polymer to the thermoset then take place in one operation, thereby saving time and energy. To benefit from this advantage, a heat-treatable aluminium material has to be used.

Having generally described this invention, a further understanding can be obtained by reference to certain specific examples which are provided herein for purposes of illustration only, and are not intended to be limiting unless otherwise specified.

Examples

The following woven carbon fibre fabric was used as the textile fabric in all tests: Torayca FT 300 3K 200tex 200 g/m$^2$ twill weave.

All the tests were carried out using aluminium sheets 0.18 mm in sheet thickness. Aluminium H 4S Temper 29 from Novelis of Göttingen was concerned.

The mixture used in Example 0, a comparative example not in accordance with the present invention, was a reactive polyurethane composition prepared as described in Example 2 of DE102011006163A1. The recipe is depicted in table 0.

The mixtures used for Inventive Examples 1 and 2 had recipes as per tables 1 and 2.

TABLE 0

Recipe of mixture for Comparative Example 0
Comparative Example 0 (not in accordance with the present invention)

| | | | |
|---|---|---|---|
| Hardener (60% strength) (Effective NCO: 7.7%) | Uretdione hardener | 65.3 wt % | Evonik Industries |
| Polyol 4640 (OHN 630 mg KOH/g molar mass 360 g/mol liquid | Binder | 10.9 wt % | Perstorp |
| Benzoin | Degassing agent | 0.2 wt % | Aldrich |
| Butyl acetate | Solvent | 23.6 wt % | Fluka |

TABLE 1

Recipe of mixture for Inventive Example 1
Example 1 (in accordance with the present invention)

| | | | |
|---|---|---|---|
| BL 1320 hardener (NCO: 14%) | Uretdione hardener | 32.9 wt % | Evonik Industries |
| Capa 4101 (OHN 224 mg KOH/g molar mass 1000 g/mol, liquid | Binder (Polyol) | 20.3 wt % | Perstorp |
| Epoxy resin E | Oxirane Cobinder | 4.4 wt % | Momentive |
| Methyl isobutyl ketone/ isopropyl acetate | Solvent | 42.4 wt % | Fluka |

TABLE 2

Recipe of mixture for Inventive Example 2
Example 2 (in accordance with the present invention)

| | | | |
|---|---|---|---|
| BL 1320 hardener (NCO: 14%) | Uretdione hardener | 34.0 wt % | Evonik Industries |
| Capa 4101 (OHN 224 mg KOH/g molar mass 1000 g/mol, liquid | Binder (Polyol) | 24.7 wt % | Perstorp |
| Epoxy resin D | Oxirane Cobinder | 6.5 wt % | Momentive |
| Methyl isobutyl ketone/ isopropyl acetate | Solvent | 34.8 wt % | Fluka |

The ingredients from the tables were in each case processed into a homogeneous solution by means of a dissolver.

To coat the textile fabric with the mixture (to form the prepreg), the woven carbon fibre fabric was impregnated with the solution of the matrix materials and then oven dried at 140° C. for 10 minutes. (Method steps d and e)

The prepregs were subsequently introduced between two plies of metal sheet and compressed with a LaboPress P 400 S from Vogt at temperatures between 120 and 170° C. to form a sandwich in each case. The pressure was varied between standard pressure and 20 bar. Frames may additionally be used as spacers. Residence time was varied between 3 minutes and 20 minutes. (Method step f)

The temperature of the press was set to 170° C. in Comparative Example 0 and Inventive Examples 1 and 2. Pressure during the residence time of 3 minutes was controlled to 10 bar, frames were used in addition.

Directly following removal of the sandwich panels from the press and cooling to room temperature, the forming step was carried out using an ERICHSEN cupping tester (ERICHSEN cupping test to DIN EN ISO 1520) model 202. (Method step g)

The sandwich panels formed into the shaped articles were then cured in an oven at temperatures between 180 and 200° C. into a respective fibre composite component part in the course of 60 minutes. (Method step h).

Sheetlike specimens for adherence tests were produced without the forming step g (Erichsen cupping) following process steps d, e, f and has described. To this end, strips 40 mm in width were cut out of the sandwich, by means of sheet shears, after the pressing operation and tested on a Universal tensile tester from Zwick. The test was carried out in accordance with ASTM D 1876 as T-peel test on test specimens 20 mm in width.

When the sandwich of Comparative Example 0 came to be formed (method step g), the outer sheets completely detached from the woven carbon fibre fabric and could not be further processed.

Detachment of the outer sheets was likewise observed when cutting out the sheet like test specimens, so making it impossible to carry out the adherence test.

The experimental results are summarized in table 3.

TABLE 3

Experimental results

| | Erichsen cupping (mm) | T-peel test Fmean (N/40 mm) |
|---|---|---|
| Example 0 | Sandwich destroyed | — |
| Example 1 | 5 mm, adherence ok | 144 |
| Example 2 | 5 mm, adherence ok | 158 |

Comparison of the experimental results shows that it is only when the mixture has the composition of the present invention that it is possible to produce sandwich panels whose integrity is not destroyed in the course of forming into the shaped article. The adherence to the aluminium sheets of the thermoplastic polyurethane obtained from the mixture recipe of the present invention is thus sufficient to keep the sandwich bonded together during the forming step. The shaped article thus obtained can subsequently be cured into a fibre composite component part by heat treatment. In the process, the thermoplastic polyurethane becomes further crosslinked into a thermoset material.

German patent application 102014208423.7 filed May 6, 2014, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method of producing a fibre composite component part, comprising:
   a) preparing an anhydrous mixture comprising:
      at least one hardener comprising a uretdione having an NCO functionality of not less than two,
      at least one binder having hydroxyl groups and an OH functionality of three to six, and
      at least one cobinder having oxirane groups;
   b) coating a textile fabric with the anhydrous mixture, to obtain a mixture-coated fabric;
   c) applying energy to the mixture-coated fabric to obtain a first crosslinking reaction of the hardener, binder and cobinder to form a thermoplastic polymer adhered to the textile fabric;
   d) hot pressing two metal sheets and the textile fabric together with the thermoplastic polymer adhered thereto into a sandwich such that the thermoplastic polymer contacts a metal surface of the metal sheets and joins the metal sheets together while enclosing the textile fabric;
   e) forming the sandwich into a shaped article; and
   f) heat treating the shaped article to obtain the fibre composite component part, wherein the thermoplastic polymer undergoes a second crosslinking reaction to convert into a thermoset polymer; wherein
   the metal sheets are aluminum or an alloy of aluminum which is capable of being heat-treated.

2. The method according to claim 1, wherein the anhydrous mixture is a dry pulverulent mixture and is sprinkled onto the textile fabric in the coating b).

3. The method according to claim 1, wherein the anhydrous mixture is in the form of a solution in at least one organic solvent, and coating b) further comprises impregnating the textile fabric with the solution, and subsequently removing the solvent from the textile fabric by evaporation.

4. The method according to claim 3, wherein the evaporation of the solvent and the application of energy to the mixture to obtain the first crosslinking reaction c) is carried out in one operation by heating at a temperature of 80° C. to 160° C., where heating time is in the range from 10 minutes to 30 minutes.

5. The method according to claim 1, wherein hot-pressing the metal sheets and the textile fabric together with the thermoplastic polymer adherent thereto into the sandwich d) is at a temperature of 80° C. to 180° C., a duration time for the heating is from 3 minutes to 20 minutes.

6. The method according to claim 1, wherein the forming of the sandwich into the shaped article is carried out at a temperature of 20° C. to 160° C.

7. The method according to claim 1, wherein the heat treatment of the shaped article for the purpose of performing the second crosslinking reaction takes place at a temperature of 170° C. to 210° C., wherein said heat treatment of the shaped article takes place at a temperature which is not less than 20° C. higher than the temperature at which the first crosslinking reaction is carried out, and wherein the thermal treatment is carried out for a period of 20 minutes to 60 minutes.

8. The method according to claim 1, wherein at least one metal sheet comprising a heat-treatable alloy of aluminium is utilized.

9. The method according to claim 1, wherein the metal sheets comprise a corrosion-resistant coat.

10. The method according to claim 1, wherein the hardener is free of a blocking agent and comprises a uretdione of a diisocyanate selected from the group consisting of:
   isophorone diisocyanate (IPDI), hexamethylene diisocyanate (HDI), diisocyanatodicyclohexylmethane (H12MDI), 2-methyl pentane diisocyanate (MPDI), 2,2,4-trimethylhexamethylene diisocyanate/2,4,4-trimethylhexamethylene diisocyanate (TMDI) mixture, and norbornane diisocyanate (NBDI).

11. The method according to claim 1, wherein the binder comprises at least one polyol compound.

12. The method according to claim 1, wherein the binder comprises at least one polyester with an OH number of between 25 and 400, with an acid number of not more than 2 mg KOH/g and with a molar mass of between 1000 and 4000 g/mol.

13. The method according to claim 1, wherein the binder comprises at least one polycaprolactone with an OH number between 540 and 25, with an acid number between 0.5 and 1 mg KOH/g and with a molar mass between 240 and 1000 g/mol.

14. The method according to claim 1, Wherein an epoxy equivalent weight (EEW) of the cobinder is from 182 to 940 g/eq.

15. The method according to claim 1, wherein the cobinder comprises an epoxy resin selected from the group consisting of epoxy resin based on bisphenol A diglycidyl ether, epoxy resin based on bisphenol F diglycidyl ether and a cycloaliphatic compound.

16. The method according to claim 1, wherein the anhydrous mixture is free from a substance that has a catalytic effect on the first and/or second crosslinking reaction.

17. The method according to claim 1, wherein the textile fabric comprises a woven fabric, a non-crimp fabric, a knitted fabric or a nonwoven fabric of carbon fibre, glass fibre or aramid fibre.

18. The method according to claim 1, wherein operations a) to f), up to and including the stage of the sandwich being obtained, are carried out as a continuous roll-to-roll process.

19. The method according to claim 1, wherein the sandwich obtained as per step f) is immediately or only after a pause of 1 to 6 months formed into a shaped article as per step g).

* * * * *